No. 874,089. PATENTED DEC. 17, 1907.
J. C. LARKAM.
VALVE OPERATING APPARATUS.
APPLICATION FILED AUG. 27, 1906.
2 SHEETS—SHEET 2.
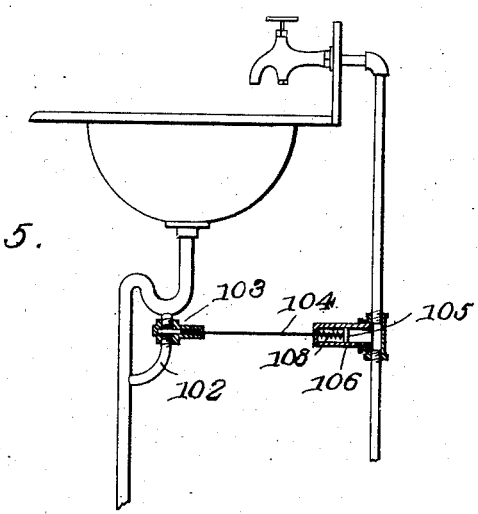
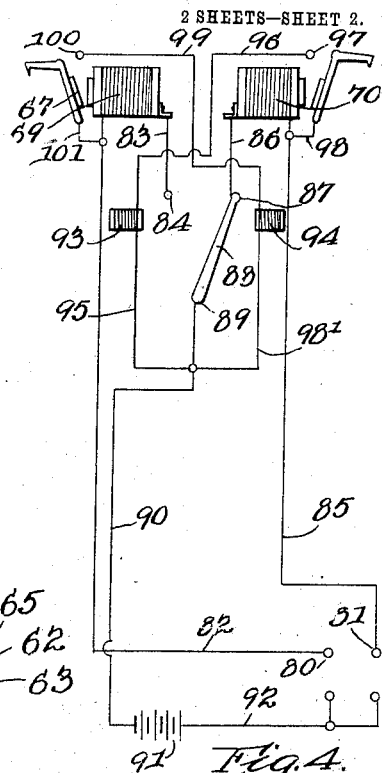
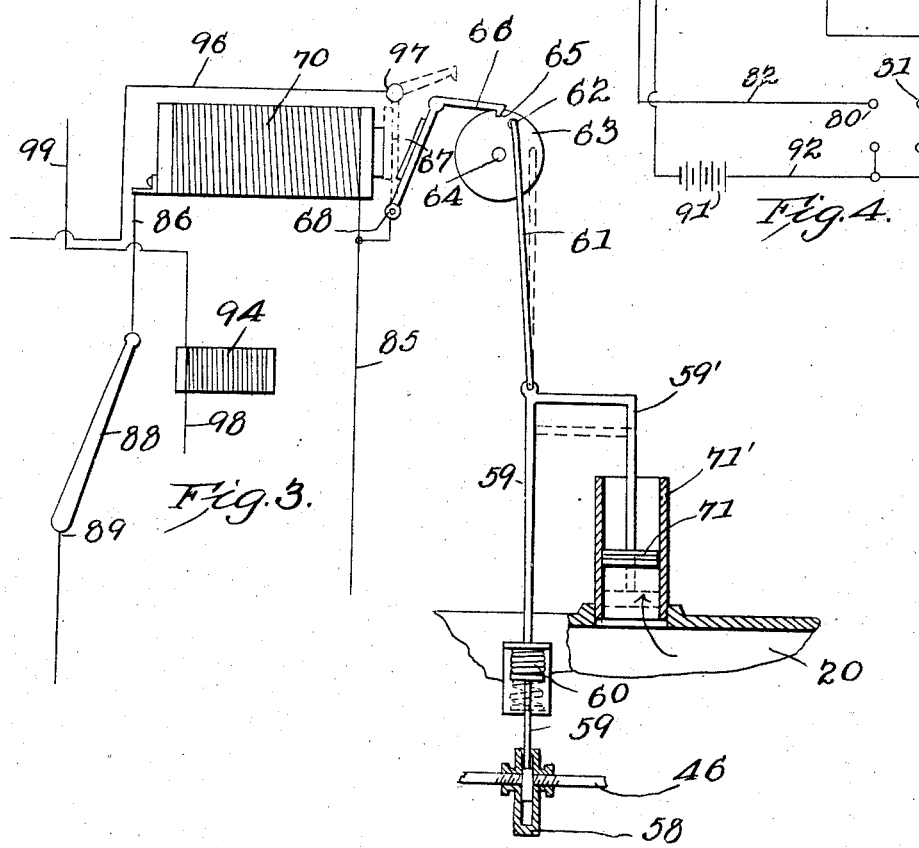
WITNESSES:
John C. Larkam INVENTOR.
By
ATTORNEYS

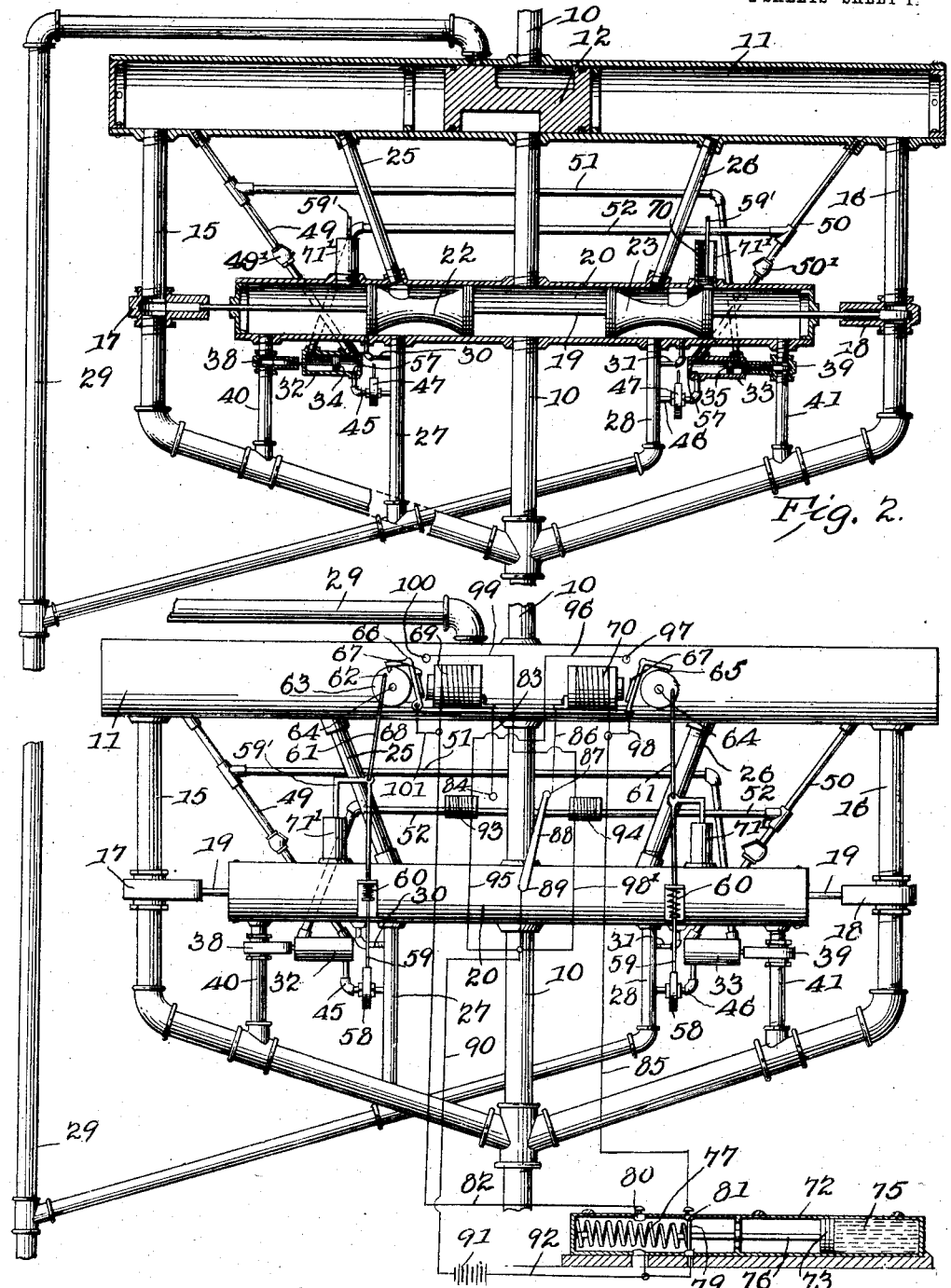

UNITED STATES PATENT OFFICE.

JOHN C. LARKAM, OF KANSAS CITY, MISSOURI.

VALVE-OPERATING APPARATUS.

No. 874,089.  Specification of Letters Patent.  Patented Dec. 17, 1907.

Application filed August 27, 1906. Serial No. 332,267.

*To all whom it may concern:*

Be it known that I, JOHN C. LARKAM, a citizen of the United States, residing at Kansas City, in the county of Jackson and State of Missouri, have invented a new and useful Valve-Operating Apparatus, of which the following is a specification.

This invention relates to valve operating mechanisms, and has for its principal object to provide a valve for controlling the flow of water or other fluid in which the position of the valve is determined by a thermostat.

A further object of the invention is to provide a thermostatic valve operating mechanism which is adapted especially for cutting off the flow of water or other fluid through a supply pipe, and draining the pipe in order to prevent freezing when exposed to low temperature.

A still further object of the invention is to provide an apparatus of this character that is quickly responsive to variations in temperature, and in which the pressure or weight of fluid being controlled is utilized to accomplish the actual work of closing or opening the valve, the thermostat operating only as a means for starting the operations.

A still further object of the invention is to provide a device of this type in which electro-magnets are employed in a circuit that is under the control of the thermostat, provision being made for immediately opening the circuit after each operation, or energizing of the electro-magnet, in order to avoid waste of current, and to adjust the parts to operative position in readiness for the next circuit closing operation.

A still further object of the invention is to provide a novel form of valve and valve operating means, and to provide for the drainage of water from the pipe, and further to provide for the drainage of traps or the like, and for the discharge of the contents of flushing reservoirs when necessary.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a general elevation, illustrating an improved valve operating mechanism constructed in accordance with the invention. Fig. 2 is a sectional view of the same. Fig. 3 is a detail view drawn to an enlarged scale, showing the inner valve operating mechanism. Fig. 4 is a diagram of the wiring connections. Fig. 5 is an elevation, partly in section, illustrating the means employed for draining the traps of basins and the like to prevent freezing.

Similar numerals of reference are employed to indicate corresponding parts throughout the several figures of the drawings.

In carrying out the invention, the apparatus is preferably so arranged in the cellar or basement of a house or other building as to cut off the inflow of water, and to drain the whole of the supply pipe or pipes leading through the house in order to prevent freezing at comparatively low temperature. The main pipe 10 is in the present instance arranged for the upward flow of a current of water to a point above the main valve casing 11, and the passage of the water is under the control of a piston valve 12, which under normal conditions will remain in the position shown in Fig. 2, allowing the free passage of water. The valve 12 is arranged within the valve chamber 11, the latter being in the form of an elongated cylinder that is connected at its opposite ends by pipes 15 and 16 to the main supply pipe 10, and provision is made for controlling the flow of water through these pipes, so that the water pressure may be made to act on one or other end of the piston valve 12, and move the same to either open or closed position. In the two pipes 15 and 16 are arranged valves 17 and 18, respectively, and these valves are both connected to the same valve stem 19, which latter extends through an elongated cylindrical casing 20 that is preferably disposed below and parallel with the cylinder 11. The stem 19 also carries two piston valves 22 and 23, which control the discharge of water from the opposite ends of the casing 11, the water being arranged to drain from the ends of said casing 11 through pipes 25 and 26, which lead to the casing 20, and from thence the water may flow through pipes 27 and 28 to a main drain pipe 29, into the sewer or other convenient point of discharge. This main pipe 29, also, extends to the casing 11, and is so arranged that when the valve 12 is closed to cut off the flow from the pipe 10 below the valve 12, all of the water contained in said pipe 10 above the valve will be drained off, so that freezing will be prevented.

Leading from the opposite ends of the cylindrical casing 20 are two drain pipes 30 and 31, these being arranged to alternately place the left hand end of the cylinder 20 in communication with the drain pipe 27, and the right hand end of the cylinder in communication with the drain pipe 28. Below the cylinder 20, at points near the opposite ends thereof, are small cylinders 32 and 33 in which are arranged pistons 34 and 35, respectively. These pistons have suitable rods which are connected, respectively, to valves 38 and 39 that are arranged in pipes 40 and 41, these pipes leading between the branches 15 and 16 respectively of the water main, and the outer ends of the cylinder 20. The inner ends of the two cylinders 32 and 33 are connected by pipes 45 and 46 to the drain pipes 27 and 28, respectively, and the inner ends of these cylinders are likewise connected to two smaller pipes 49 and 50, the pipe 49 leading from the left hand end of cylinder 11, while the pipe 50 leads from the right hand end thereof. Extending from the pipe 49 is a branch pipe 51 which leads to the outer or right hand end of the cylinder 33, and leading from the pipe 50 is a branch 52 which connects to the outer or left hand end of the cylinder 32.

If the parts are in the position shown in Fig. 2, and the inner end of cylinder 33 is drained, that is to say, if communication is opened between the cylinder and the small drain pipe 46 under the control of a gate valve 58 hereinafter described so that the water may flow out to and through the drain pipe 28, the pressure of water passing from the left hand end of cylinder 11 through pipe 49 and pipe 51 to the right hand end of the cylinder 33 will cause the piston 35 to move to the left and open the valve 39, whereupon water will flow up through the pipe 16 and pipe 41 into the right hand end of cylinder 20, thus forcing the piston valve 23 to the left. This movement is communicated to all of the valves carried by the rod 19, so that valve 23 will be closed to cut off communication between the pipes 26 and 28, while valve 22 will be opened in order to allow the drainage of water from the left hand end of cylinder 11 through pipes 25 and 27. At the same time the valve 17 of the main branch 15 will be closed, and the valve 18 of the main branch 16 will be opened, allowing water to pass up from the main 10 to the right hand end of cylinder 11, so that the valve 12 will be forced to closed position, thus cutting off the flow of water upward through the supply pipe, and placing such pipe in communication with the main drain 29, so that all of the water in the supply pipe may be drained off. When the valve 23 has completed its stroke to the left, it will automatically open the port leading to the drain pipe 31, so that all of the water from the right hand end of cylinder 20 will be drained off. The controlling device through which communication was established between the upper inner end of cylinder 33 and drain pipe 46 (and consisting of the above mentioned gate valve) is now closed, and water under pressure will pass from the right hand end of cylinder 11 through the pipe 50 to the left hand end of cylinder 33, where it will act on the piston 35, and move the valve 39 to closed position. The water at this time in the right hand end of cylinder 33 is displaced, and forced outward through the pipe 51 until the valve 39 is closed. In order to prevent the forcing of the water from the inner ends of the cylinders through the pipes 49 and 50 when pressure is supplied to the outer ends thereof, these pipes are provided with one way check valves 49' and 50' which close to prevent passage of the liquid from said cylinders. The parts will now remain in this position with the flow of water cut off until a similar connection in the pipe 45 is opened, allowing the water to drain from the inner or right hand end of cylinder 32 when the positions of all of the parts are reversed and valve 12 will be opened.

In order to control the discharge through the small drain pipes 45 and 46, each pipe is provided with a small valve casing 47 within which is a gate valve 58 having a stem 59 that is engaged by a coiled spring 60 that tends normally to move the valve to open position. The stems 59 of the valves are connected by rods 61 to wrist pins 62 of small disks 63 that are mounted on short shafts 64. In the periphery of each disk is a notch that is arranged for the reception of a lug 65 carried by an arm 66, the latter extending from the upper end of an armature lever 67 which is pivoted on a pin 68. To operate these two armatures two electromagnets 69 and 70 are employed, and when either magnet is energized, the lug 65 under the control of that magnet will move out of engagement with the notch of the disk, and the spring 60 will thereupon act to open the valve and turn the disk through an arc of forty-five or fifty degrees. As soon as this is accomplished the energizing circuit of the electro-magnet is broken and the armature moves away from the magnet, placing the lug 65 in position to reënter the notch when the disk is turned to its initial position. To accomplish this return movement of the disk the stem 59 is connected to an auxiliary stem or rod 59' which carries a piston 71, working in a small cylinder 71', the lower end of which communicates with the valve casing of cylinder 20 and when the water under pressure enters said cylinder 20 and moves the valves 22 and 23 in the proper direction, the lower end of the cylinder 71' will be placed in communication with said chamber, and a portion of the water will act on the piston 71 forcing the same upward, and raising the valve 58 to its closed position and at the same time turning the disk 63 until the notch is moved in position to be automatically engaged by the lug 65 and again locked in place.

Arranged at the intermediate point is a thermostat 72 hermetically sealed and containing a movable piston 73 on one side of which is a body of expansible material 75, mercury being usually employed. The piston 73 has a stem 76 that is acted upon by a spring 77 that tends to resist movement of the spring under the weight of the mercury, and to follow up the mercury as the latter contracts when exposed to low temperature. This stem carries a contact bar 79 that is arranged to engage terminals 80 and 81 spaced from each other, and so arranged that when the temperature reduces to the freezing point, the contact arm 79 will engage contacts 81 to complete a circuit through the electro-magnet 70, and when the temperature increases, the contact 79 will move into engagement with the contacts 80 and close a circuit through the electro-magnet 69. From the contact 80 leads a wire 82 to the electromagnet 69, and from the electro-magnet leads a wire 83 to a contact point 84. From the contact 81 leads a wire 85 to the electro-magnet 70 and from the latter leads a wire 86 to a contact 87. These two contacts are under the control of an armature lever 88 that is pivoted on a pin 89, and is connected by a wire 90 to a battery 91, and from the opposite pole of the battery leads a wire 92 that is connected to the second set of contacts 80 and 81. The armature lever 88 has a double armature that is arranged under the control of a pair of electro-magnets 93 and 94, and these are connected in circuits leading from the wire 90, the circuit of the magnet 93 being traced through wire 95, to the electro-magnet, and thence through wire 96 to a contact 97 that is arranged in the path of movement of the armature 67, and the armature 67 is connected by a wire 98 to the wire 85. The circuit of the electro-magnet 94 may be traced from wire 90 to a wire 98', to the electro-magnet, and thence through a wire 99 to a contact 100 arranged in the path of movement of the second armature 66, and from thence by a wire 101 to the wire 82.

If the mercury contracts and the contact 79 is moved to engage the two contacts 81, a circuit may be traced from the battery through the wire 90, to armature lever 88, contact 87, wire 86, electro-magnet 70, wire 85, contact 81, contact 79, the second contact 81, and wire 92 back to battery. When the electro-magnet 70 is energized, it attracts the armature 66, and the disk 63 is released, allowing the valve under the control of said disk to move to open position as previously described. As soon, however, as the armature 66 moves up to the pole of the magnet, it will engage with the contact 97, and thereupon a circuit may be traced from the battery 91 to wire 90, wire 95, electro-magnet 93, wire 96, contact 97, armature 67, wire 98, wire 85, contact 81, contact 79, the second contact 81, and wire 92 back to battery. This energizes the electro-magnet 93, and the latter immediately attracts the armature lever 88, so that the latter will move from engagement with the contact 87 into engagement with the contact 84, and will instantly break the circuit of the electro-magnet 70, and place the armature of the electro-magnet 69 in such condition that when the contact 79 moves into engagement with the contacts 80 on increase in temperature, the circuit through the electro-magnet 69 will be instantly closed, and the operation reversed. This will then close circuit through the electro-magnet 94, and the armature lever 88 will be attracted to the right, and partly close the circuit through the electro-magnet 70 in readiness for the next operation when the temperature is lowered.

In order to provide for the draining of traps or the like, the lower portion of each trap is connected by a pipe 102 to the main drain pipe, and connection between the two is normally closed by a valve 103. This valve is carried by a stem 104 that is connected to a piston 105 arranged within a cylinder 106. The piston is acted upon in one direction by a helical compression spring 108 that tends normally to move the valve to open position, and movement of the piston in the opposite direction is effected by connecting the cylinder 106 to the main water supply pipe, and so long as there is any water under pressure within the main supply pipe, the resistance of the spring will be overcome and the valve will be maintained in its closed position. When the supply is cut off by the automatic mechanism hereinbefore described, and the main pipe is drained, the pressure will be removed from the outer face of the piston and the spring will then act to move the valve to open position, and allow the contents of the trap to discharge into the drain pipe.

I claim:—

1. In apparatus of the class described, a pipe arranged for the flow of a fluid under pressure, a cylinder connected in said pipe, a loose piston valve mounted in said cylinder and arranged to control the flow of fluid through the pipe, a discharge pipe also communicating with the cylinder and under the control of said valve, valved pipes for controlling the flow of a valve actuating fluid to said cylinder, and a thermostat controlling the operation of said valves.

2. In apparatus of the class described, a cylinder, a supply pipe connected thereto, service and discharge pipes also connected to the cylinder, a loose piston valve mounted in the cylinder and arranged in one position to place the supply and service pipes in communication, and in another position to establish communication between the service and the discharge pipes, valved pipes for controlling the flow of a valve actuating fluid to the cylinder, and a thermostat controlling the operation of said valves.

3. In apparatus of the class described, a cylinder, a supply pipe connected thereto, service and discharge pipes also connected to the cylinder, a loose piston valve disposed in the cylinder and controlling the flow of fluid from the supply pipe to the service pipe and from the service pipe to the discharge pipe, a second cylinder, pistons arranged therein, branched communication between the second cylinder and the supply pipe, auxiliary discharge pipes leading from the ends of the first cylinder and connected to the main discharge pipe, valves in said auxiliary discharge pipes and under the control of the pistons of the second cylinder, and thermostatically actuated valve mechanism for controlling the operation of the valves and pistons.

4. In apparatus of the class described, a trap drain pipe, a valve for closing communication between the trap and drain pipe, a piston connected to the valve, a cylinder in which said piston is contained, a spring tending to move the valve to open position, and a water supply pipe connected to the cylinder, and through which water under pressure is supplied to maintain the valve in closed position.

5. In apparatus of the class described, the combination with a fluid supply pipe, and a drain pipe, of a cylindrical casing to which the supply pipe is connected, a piston valve arranged in said casing, connecting pipes between the supply pipe and the opposite ends of the cylindrical casing, valves controlling said connection, springs tending to move said valves to open position, pistons connected to the valves, cylinders in which said pistons are contained, means for admitting fluid under pressure to said cylinder to effect closing of the valves, electro-magnets by which the opening movements of said valves are controlled, a thermostat, electric circuits connecting the thermostat to the electromagnets, and means in the circuit for automatically breaking the circuit of an energized magnet immediately after each operation.

6. In apparatus of the class described, the combination with a water supply pipe, and a drain pipe, of a cylindrical valve casing connected in the supply pipe, a piston valve arranged in said casing, connecting pipes between the supply pipe and the opposite ends of the said casing, drain connections leading from the opposite ends of the casing, valves for controlling the flow of water through the drainage pipes, fluid pressure actuated pistons connected to said valves, a cylinder in which said pistons are arranged, said cylinder having its opposite ends connected to the drainage pipes, valves carried directly by said pistons, drainage passages under the control of the piston carried valves, spring opened valves controlling the admission of water to said cylinder, auxiliary cylinders in communication with said cylinder, pistons in said auxiliary cylinders and connected to the spring opened valves, a pair of disks, rods connecting said disks to the spring opened valves, each disk having a notched periphery, a pair of electro-magnets, an armature lever for each electro-magnet, a catch carried by each armature lever and arranged to engage a notched periphery of the disk, a thermostat, electric circuits extending between the thermostat and the electro-magnets, and means in said circuits for automatically breaking the circuit immediately after the energizing of each electro-magnet.

In testimony that I claim the foregoing as my own, I have hereto affixed my signature in the presence of two witnesses.

JOHN C. LARKAM.

Witnesses:
LESTER W. HALL,
G. T. AUGHINBAUGH.